May 23, 1944. G. LUNDIN 2,349,442
SEED GRADING MACHINE
Filed June 12, 1941 4 Sheets-Sheet 1
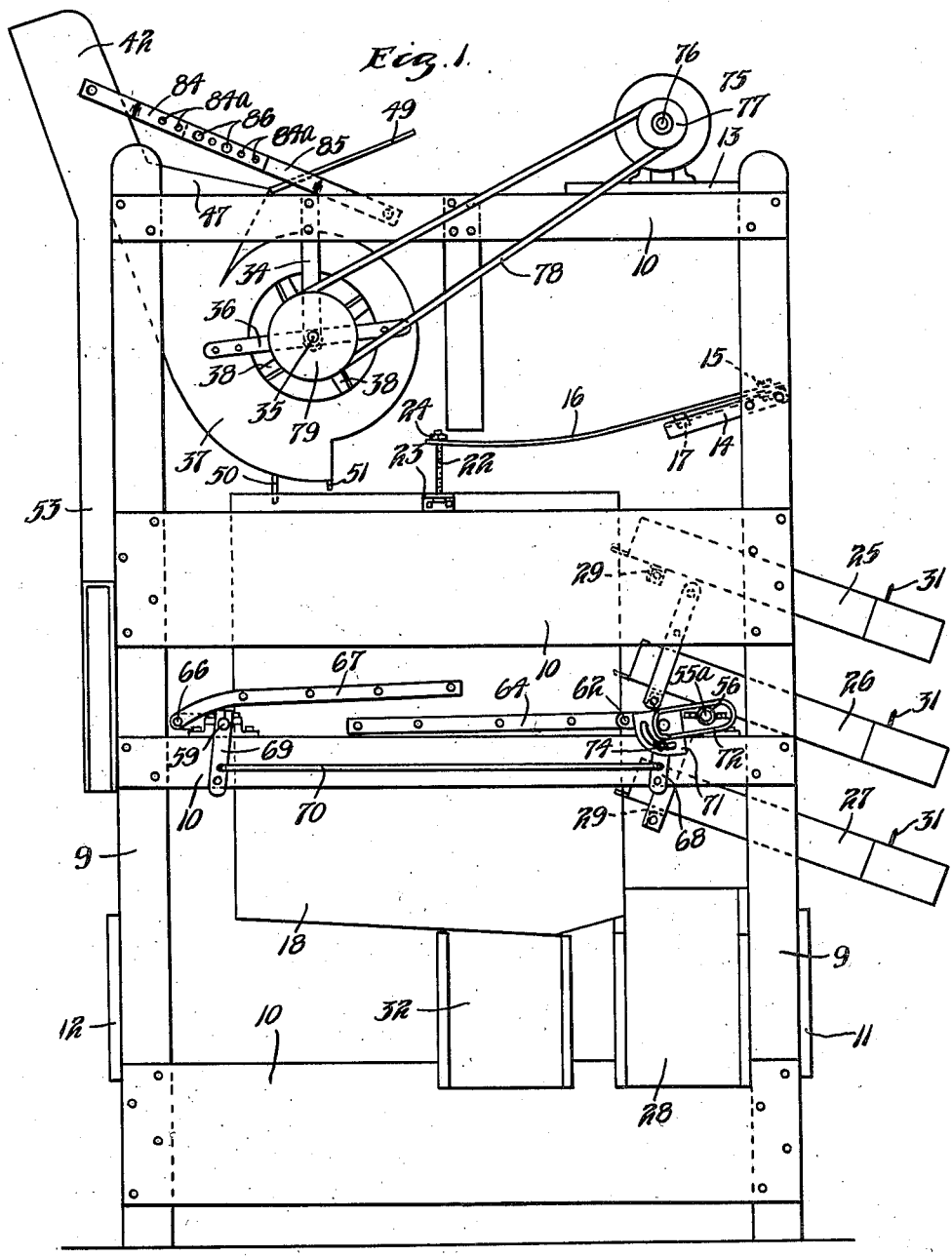
INVENTOR.
GEORGE LUNDIN.
BY HIS ATTORNEYS.
Williamson & Williamson

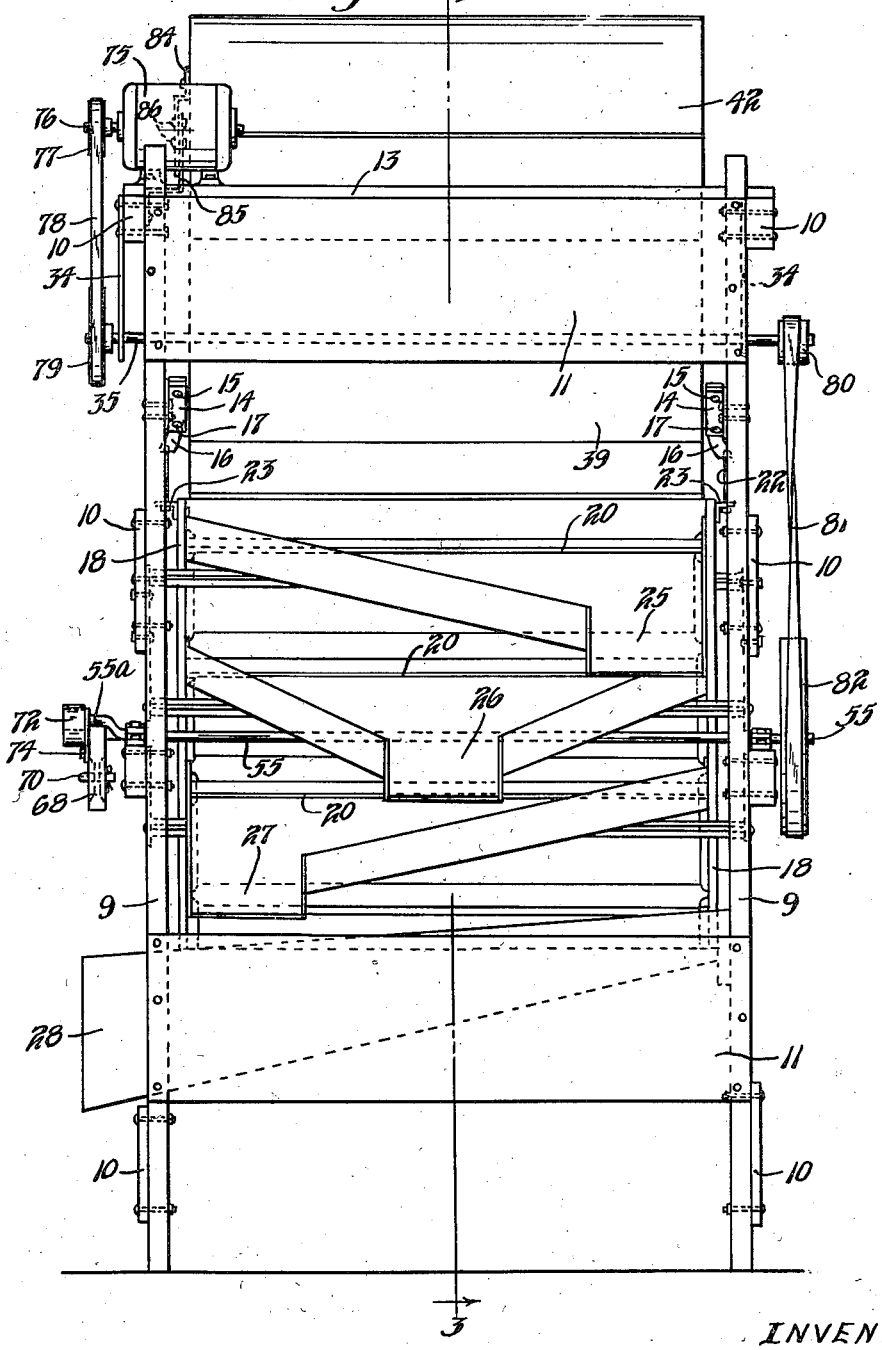

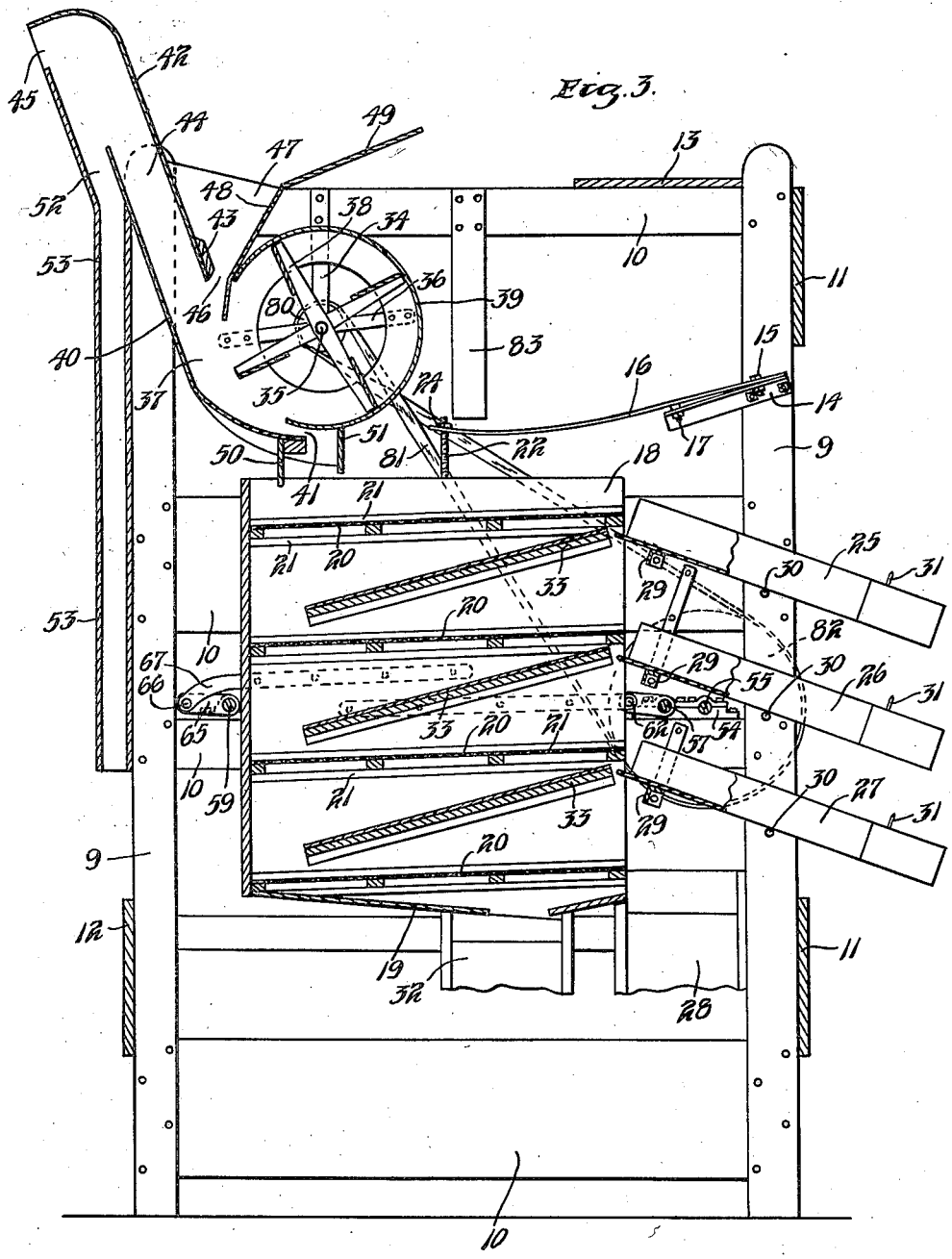

May 23, 1944.                G. LUNDIN                  2,349,442
                          SEED GRADING MACHINE
                         Filed June 12, 1941          4 Sheets-Sheet 4
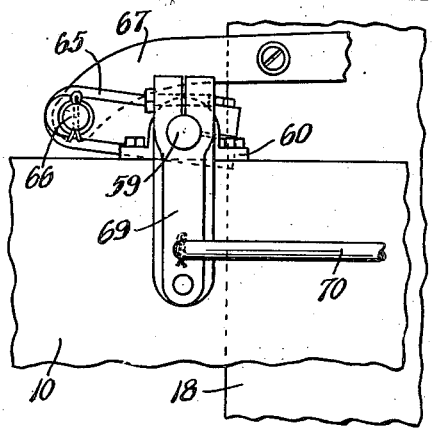
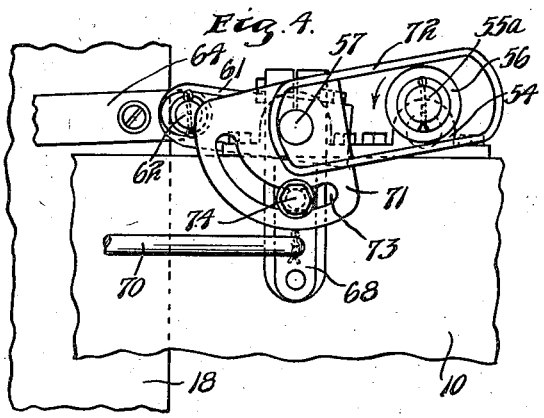
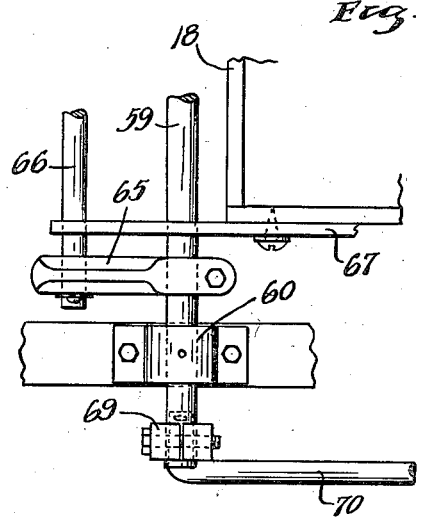
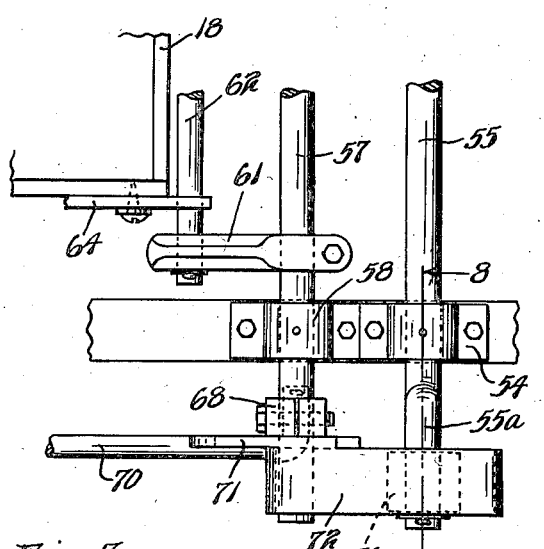
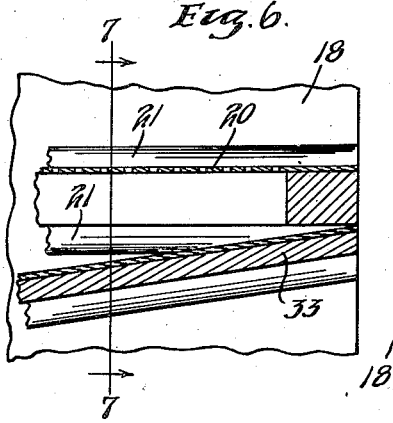
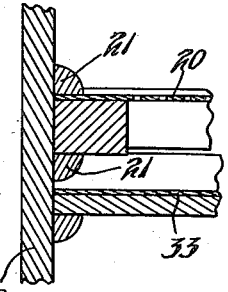
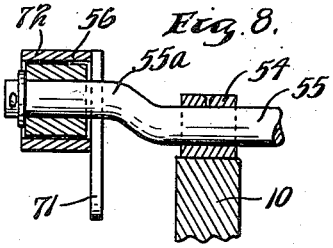
INVENTOR.
GEORGE LUNDIN.
BY HIS ATTORNEYS.
Williamson & Williamson Patented May 23, 1944

2,349,442

UNITED STATES PATENT OFFICE 2,349,442

SEED GRADING MACHINE

George Lundin, Dassel, Minn.

Application June 12, 1941, Serial No. 397,701

4 Claims. (Cl. 209—317)

This invention relates to seed grading machines.

It is one of the objects of the invention to provide a novel and improved seed grading machine including a shaker box carrying a plurality of screens at different levels, the screens being of succeedingly finer mesh from top to bottom of the box, means for imparting to the box a shaking movement which displaces the box both vertically and horizontally and means for varying the vertical displacement relative to the horizontal displacement of the shaker box as the same is shaken.

Another object is to provide a seed grading machine including a hopper from which the seed is delivered by gravity, a blower to which the seed is delivered from the hopper, and means for directing the blast from the blower into the seed stream at various angles relative to the hopper, the blower acting to carry away dirt, dust and chaff from the seeds prior to the grading action.

Another object is to provide a novel means for supporting a shaker box carrying grading screens in a seed grading machine and for imparting different types of shaking movement to the shaker box.

The objects and advantages of the present invention will more fully appear from the following description made in connection with the accompanying drawings, wherein like reference characters refer to the same or similar parts throughout the various views, and in which—

Fig. 1 is a view in side elevation of a seed grading machine embodying the invention;

Fig. 2 is a view in rear elevation of the machine looking toward the right side of the machine as shown in Fig. 1;

Fig. 3 is a vertical section taken substantially on the line 3—3 of Fig. 2 as indicated by the arrows;

Fig. 4 is a view in enlarged scale taken substantially as in Fig. 1 of the shaker mechanism;

Fig. 5 is a plan view looking down on the shaker mechanism;

Fig. 6 is a detail in enlarged scale showing certain of the parts of the shaker box as viewed in Fig. 3;

Fig. 7 is a vertical section taken on the line 7—7 of Fig. 6 as indicated by the arrows; and Fig. 8 is a vertical section taken on the line 8—8 of Fig. 5 as indicated by the arrows.

In accordance with the invention there is provided a suitable frame which as shown includes four vertical posts 9 arranged at the corners of a rectangle, interconnected by a plurality of upper, intermediate and lower bars 10 at the two sides of the machine, interconnected by upper and lower bars 11, at what will be called the rear of the machine, and interconnected by a lower bar 12, at what will be called the front of the machine. The upper bars 10 at the two sides of the machine are also preferably interconnected by a top bar 13. The posts 9 at the right side of Figs. 1 and 3 will be called the rear posts in contradistinction to the posts 9 at the left of Figs. 1 and 3 which will be called the front posts.

Secured to the two rear posts 9 near to but spaced from the upper ends of the same at the inner sides of these two posts are a pair of spring brackets 14 preferably of angle iron construction, these brackets projecting downwardly and inwardly from the rear posts 9. Secured by bolts 15 to the upper flanges of the spring brackets 14 are a pair of curved bar springs 16 which project inwardly to about the center of the frame taken from front to rear of the machine. To properly tension the springs 16 spacer bolts 17 are carried by the inner end portions of the spring brackets 14 to underlie the springs 16.

A shaker box 18 is resiliently supported from the frame of the machine by means of the two springs 16. This shaker box 18 has a front wall and two side walls but no rear wall. It has at its bottom a shallow hopper 19. Carried by the shaker box 18 are a plurality of sifting screens 20 set at different levels and of succeeding finer mesh from the top to the bottom of the box 18. These screens in the illustrated embodiment are shown as being four in number and each screen is removably and slidably received by the shaker box 18 between upper and lower spaced channel forming cleats 21 carried by the sides of the shaker box. It will be noted that the screens 20 and the cleats 21 have a slight upward pitch relative to the horizontal from the adjacent forward side of the box 18 to the rear or open side thereof. The shaker box is carried from the springs 16 by means of upstanding studs 22 carried by brackets 23 at the top of the two sides of the box 18. These studs 22 run through openings in the springs 16 and carry adjusting nuts 24 above the springs whereby adjustment of the spacing of the shaker box relative to the springs 16 can be made.

Discharge chutes 25, 26, 27 and 28 are provided for the respective four screens to carry off the seed which does not sift through the respective screens and which works over the rear or discharge ends of the screens, i. e., the right ends of the screens as viewed in Fig. 3 of the drawings. The three chutes 25, 26 and 27 are secured to bars 29 pivotally mounted for swinging movement on intermediate bars 10 at the two sides of the machine. Each of the three chutes 25, 26 and 27 has at its receiving end a projecting lip underlying the discharge end of the screen 20 with which it cooperates. Each chute 25, 26 and 27 is adapted to rest in an inclined position as on pins 30 carried by the inner sides of the two rear legs 9. The three chutes 25, 26 and 27 carry at their outlet mouth, bag supports 31 and in order that the bags can be supported from these mouths at the rear end of the machine so that the bags will not be in alignment when the machine is in use, the chutes 25, 26 and 27 are so made that the mouths of the respective chutes are spaced from each other transversely of the machine as best shown in Fig. 2. In the illustrated embodiment the upper chute 25 is so arranged that its mouth lies adjacent one of the rear posts 9, the chute 26 is so constructed that its mouth lies about centrally between the two posts 9, and the chute 27 is so constructed that its mouth lies adjacent the rear post 9 opposite the post adjacent which the mouth of the chute 25 is disposed. In order that there may not be too many discharge chutes at the rear of the machine, the chute 28 receiving from the lowermost screen 20 is inclined toward one side of the machine to discharge at that side as best shown in Figs. 1, 2 and 3. The receiving portion of this chute 28 underlies the rear end of the hopper 19 as shown in Fig. 3. Receiving from the hopper 19 at the bottom of the shaker bar is another chute 32 which runs through the same side of the machine as does the chute 28.

Between the several adjacent screens 20 inclined decks 33 are supported by the side walls of the shaker box 18. These decks are located below the upper of pairs of adjacent screens and run from the discharge ends of the upper screens to points spaced from but adjacent to the forward ends of the lower screens. Of course, these decks incline downwardly and toward the front end of the machine and they act to carry the seed sifted through an upper screen downwardly to discharge onto the front end portion of the screen immediately below the upper screen. Three of these decks are shown in the illustrated embodiment.

Supported from the two upper bars 10 at the two sides of the machine at the inner sides of these bars are a pair of downwardly extending arms or brackets 34 which form bearings for a blower fan shaft 35. Pivotally connected to the shaft 35 are a pair of bars 36 which extend across air receiving openings in blower housing side plates 37 which are disposed between the two front posts 9. Extending between the two side plates 37 and partially housing a blower fan 38 carried by the shaft 35 is a curved plate 39 which in vertical cross section extends through an arc considerably greater than a semi-circle. Also extending between the two side plates 37 is a plate 40 having a rear and lower portion radially spaced from the center of the shaft 35 a greater distance than the plate 39 so as to form a discharge outlet 41 between the rear and lower portion of the plate 40 and the lower end portion of the plate 39. The lower part of the plate 40 is arcuately curved for some little distance from the lower edge of the plate 39 and then the plate 40 runs diagonally upwardly and forwardly at rather a steep angle. Another plate 42 extends between the two side plates 37 adjacent the upper portions thereof and the lower part of the plate 42 is secured to a cross bar 43 running between the two side plates 37. For most of its length the plate 42 runs parallel to the upper part of the plate 40 so as to cooperate with the side plates 37 and plate 40 to form a tangential discharge conduit 44 for the blower fan. The extreme upper part of the plate 42 is curved downwardly and forwardly to direct chaff and dirt from conduit 44 to a discharge mouth 45. The lower edge of the plate 42 is spaced from the forward upper edge of the curved plate 39 to form an inlet throat 46 leading into the blower casing. Cooperating with the lower part of the plate 42 and the side plates 37 to form a hopper 47 discharging through the throat 46 is a plate 48 having an extension deck 49 which prevents seed fed into the hopper from spilling over. It should be noted that the discharge outlet 41 from the blower casing is located over the shaker box 18 adjacent the forward end of the uppermost screen 20 so that seed running through this discharge outlet will spill onto the forward end portion of the uppermost screen 20. To better guide the material onto the screen a pair of vertical bars 50 and 51 are attached to the side bars 37 to project downwardly respectively from the lower portions of the respective plates 40 and 39.

The upper edge of the plate 40 terminates considerably short of the top part of the plate 42 so as to form an outlet 52 from the upper part of the extension of the blower casing and a chute 53 communicating with this outlet 52 is secured to the side plates 37 to run downwardly therefrom and communicate with the upper portion of the tangential discharge conduit 44.

It will be noted that the side plates 37 have no direct connection with the front posts 9 or the upper bars 10 at the sides of the machine and accordingly the entire blower casing together with the tangential discharge conduit 44 and the chute 53 may be swung on the shaft 35 as a pivot so that the air stream from the blower may be directed at different angles relative to the vertical and relative to a stream of seed which may run by gravity when fed into the hopper 47 downwardly through the throat 46. This is quite an important feature of the present device inasmuch as by tilting the blower conduit to different positions for use with seeds of different weight and sizes and carrying chaff, grass and dirt of different sizes and weights, it is possible to vary the separation by air of different weights of matter from the material fed. In order to hold the blower casing at a setting so that the tangential discharge conduit 44 extends at a desired angle relative to the vertical, there is pivotally secured as at one side of the upper part of one of the side plates 37 of the casing a bar 84 having at its non-pivoted end a multiplicity of bolt openings 84a. Another bar 85 is pivotally connected to the upper side bar 10 at the same side of the machine and this bar 85 carries a pair of bolts 86 adapted to be received through selected ones of the bolt openings 84a of the bar 84.

Referring now to the mechanism for imparting a shaking movement to the shaker box 18, there is journaled in suitable bearings 54 mounted on a pair of intermediate cross bars at the two sides of the machine near the rear posts 9, a cross shaft 55 having at one end thereof a crank portion 55a carrying a roller 56. The shaft 55 may accordingly be called a crank shaft. Another shaft 57 forwardly spaced from the shaft 55 is journaled in bearings 58 carried by intermediate bars 10 at the sides of the machine while a shaft 59 generally corresponding to the shaft 57 but located adjacent the forward side of the shaker box is journaled in bearings 60 also carried by the same intermediate bars 10. Secured to the shaft 57 are a pair of arms 61 which are pivotally connected to a rod 62 carried by brackets 64 mounted on the sides of the shaker box 18 and projecting slightly beyond the rear edge thereof. Similarly arms 65 are secured to the shaft 59 and are pivotally connected to a rod 66 carried by brackets 67 secured to the sides of the shaker box and projecting forwardly from the front side of the shaker box 18. Adjacent one end of the shaft 57 a downwardly extending arm 68 is secured to the shaft 57 while at the same end of the shaft 59 a downwardly extending arm 69 is secured to the shaft 59. The two arms 68 and 69 are pivotally interconnected by link 70. Pivotally mounted for free swinging movement on an end portion of the shaft 57 is a sector shaped plate 71 carrying as an arm thereof an elongated race 72 within which the roller 56 carried by the link portion 55a of crank shaft 55 is received. The sector shaped plate 71 is provided with an arcuate slot 73 and the plate 71 lies alongside the arm 68. The plate 71 is adapted to be releasably connected to the arm 68 at a multiplicity of angularly swung positions of the plate 71 relative to the arm 68 and for this purpose the arm 68 carries a screw 74 which projects through the slot 73 and has a head which is adapted to be clamped against the plate 71 so as to releasably clamp the plate 71 and the arm 68 together and to cause the arm 68 to oscillate with the plate 71 as the plate is oscillated. Of course, as the arm 68 oscillates the shaft 57 arms 61 also oscillate and by reason of the link 70 connecting the arm 68 with the arm 69 similar oscillation is imparted to the arm 69, shaft 59 and arms 65. For all practical purposes the arm 68, shaft 57 and one of the arms 61 form a bell crank lever, one arm of which may be secured to the sector shaped plate 71 at any one of a multiplicity of angularly set positions of the bell crank lever relative to the plate 71 and the other arm of which bell crank lever is pivotally connected to the shaker box 18. In similar manner the arm 69, shaft 59 and an arm 65 may be considered as the equivalent of a bell crank lever, one arm of which is connected by link 70 to swing with the first mentioned bell crank lever and the other arm of which is pivotally connected to the shaker box 18.

To drive the machine an electric motor 75 may be provided mounted as on the top plate 13 at one side of the machine. The motor shaft 76 is shown as carrying a pulley 77, and an endless belt 78 runs over this pulley, and a pulley 79 secured to one end of the blower fan shaft 35. At the other end of the blower fan shaft 35 another pulley 80 is secured to the shaft and an endless crossed belt 81 runs over the pulley 80, and a pulley 82 carried by the crank shaft 55 at the end thereof opposite the crank portion 55a.

Secured to the upper bars 10 at the two sides of the machine and projecting downwardly therefrom directly over the two springs 16 are a pair of arms 83 which form bumpers for the springs.

Let us assume that the machine is set as shown in the drawings and that it is to be used for grading corn, and that the motor 75 is in operation. The corn to be graded is dumped into the hopper 47 and this corn feeds down through the throat 46 into the lower part of tangential discharge conduit 44 leading from the blower fan 38. The corn drops by gravity in a vertical line from the throat 46 and the air from the blower fan 38 strikes the stream of corn, blows through the discharged stream and carries off through the discharge conduit 44 any dirt, dust, chaff or the like which may be in the corn. The lighter particles are discharged from the conduit 44 through the mouth 45. If by chance particles of corn should be carried over by the blast of air from the blower fan 38, these heavy particles will tend to drop through the outlet 52 into the chute 53 from the mouth of which they may be collected.

By varying the tilt of the blower casing the air blast from the blower fan may be directed at different angles against the stream of corn running through the throat 46 from the hopper 47 and thus adjustment can be made to carry lighter or heavier particles out through the discharge conduit 44 from the blower.

After the air separation of the dust, dirt and chaff from the corn through the blower action, the corn feeds down through the discharge outlet 41 in the blower casing onto the forward part of the uppermost screen 20, carried by the shaker box 18. As the crank shaft 55 rotates the roller 56 carried by the crank portion 55a of the crank shaft will impart an oscillatory movement to the sector shaped plate 71. This oscillatory movement will, of course, be transmitted through the screw 74 to the arm 68 to oscillate the shaft 57 and the arms 61 and it will be transmitted through the link 70 to the arm 69 to oscillate the shaft 59 and the arms 65. With the screw 74 connecting the sector shaped plate 71 to the arm 68 as shown in Fig. 4, the arms 68 and 69 will have considerable movement in a horizontal direction but very little, although some, vertical movement. As the arms 68 and 69 are respectively set in the neighborhood of 90° from the arms 61 and 65 respectively the two said arms 61 and 65 will be given considerable vertical movement and but very little, but some, horizontal movement. As the arms 61 and 65 are pivotally connected to the brackets 64 and 67 respectively attached to the shaker box 18, the shaker box will be oscillated with the arms in the general direction of movement of the outer ends of the arms. Accordingly the shaker box 18 and the screens 20 carried therein will be given an arcuate swinging movement which is chiefly a vertical movement, but slightly a horizontal movement, the box swinging upwardly and somewhat rearwardly on the shaker stroke. This shaking movement imparted to the box 18 will cause the corn laying on the various screens 21 to be agitated and to be moved somewhat toward the rear or discharge ends of the screens. As the corn is thus agitated the particles of such a size as will work through the upper screen 21 will pass through the same onto the deck 33 to slide down the deck onto the next lower screen 20 and the movement imparted to the shaker box will cause the corn on the succeeding lower screens to be worked in similar manner so that the corn will be graded. Of course, the corn that does not sift through any one of the screens 21 is gradually worked through the discharge or rear end of the screens to fall within the proper chute 25, 26, 27 or 28 which receives from that particular screen.

The springs 16 so support the shaker box 18 as to counterbalance against the pull of gravity and thus the box can be shaken readily without much resistance to movement through inertia. The adjustment of the nuts 24 on the studs 22 varies the tension of the springs 16 so that if screens 21 of heavier or lighter weight are employed or if grains of different weight are to be graded so as to vary the load of the grain on the several screens proper adjustment of the tension of the springs 16 can be made.

As shown in Fig. 3 of the drawings the blower shaft 35 will, of course, be turned in a clockwise direction and as also shown in this view and in Fig. 4 of the drawings, by reason of the use of the cross belt 81 the crank shaft 55 will be turned in a counterclockwise direction. It is important to the operation of the machine that when the machine is assembled as shown in the drawings, that the crank shaft 55 be turned in a counterclockwise direction as viewed in Figs. 3 and 4. As the crank shaft 55 turns, the crank portion 55a of the crank shaft carrying the roller 56 is in its closest position to the shaft 57 at the time that the sector shaped plate 71 is actuated to impart the upward and rearward stroke of the shaking movement to the shaker box 18. Similarly the crank portion 55a of the crank shaft carrying the roller 56 is in position farthest from the shaft 57 at the time the sector shaped plate 71 is actuated to impart the downward and forward stroke of the shaking movement to the shaker box 18. In other words, the lever arm between the axis of rotation of the shaft 57 and the axis about which the roller 56 turns is shorter at the time the shaker box is moved on its upward and rearward stroke than at the time the shaker box is moved on its downward and forward stroke. As a result of this fact the upward and rearward stroke occurs much more rapidly than the downward and forward stroke. This is quite important as by reason of this fact the seed on the various screens 21 is worked from forward portions of this screen toward rear portions thereof so that the seed really works uphill on the screens even though the screens are given the slight inclination relative to the horizontal as shown in Fig. 3. Also the quick action on the upward and rearward stroke causes the seeds to be thrown on the screens at the end of the upward and rearward stroke so that the seeds will drop back onto the screens to take a new position thereon and in this manner a thorough sifting action is obtained.

The action of the machine has been described when the screw 74 is clamped to the sector shaped plate 71 in the position shown in Figs. 1 and 4 of the drawings. As thus shown the arcuate path of shaking movement of the shaker box 18 has a major vertical component and a minor horizontal component. If the screw 74 is loosened and the arm 68 is swung relative to the sector shaped plate 71, as shown in Fig. 4 of the drawings, so that the arm 68 is swung upwardly and to the left of the position shown in Fig. 4 and the screw 74 is then tightened against the plate 71, the vertical component of the shaking movement is lessened and the horizontal shaking movement is increased. When the arm 68 is swung to such a position that the screw 74, when set is received in the upper and left hand portion of the slot 73 of the plate 71, most of the movement imparted to the shaker box 18 will be in a horizontal direction with very little movement imparted thereto in the vertical direction. By varying the position of the arm 68 relative to the sector shaped plate 71 and tightening the screw 74 at different possible settings of the arm 68 relative to the plate 71, it is possible to change the path of the arc described taken about the axes of the two shafts 57 and 59 so as to secure considerable variation between the vertical component and the horizontal component of the shaking movement. In other words, while the arc through which the shaker box moves remains the same, it is possible by changing the setting of the arm 68 relative to the sector shaped plate 71 to change the angular position of this arc through approximately 90° relative to the axis of a cylinder having as its axial center the axial center of the shaft 57. By adjustment of the arm of the sector shaped plate 71 therefore it is possible to give different types of shaking movement to the shaker box 18 and the proper shake to the shaker box for grading seeds of different types, shapes, sizes, weights, moisture content, stickiness etc. When seed having a generally spherical shape are to be graded, to secure the best separation between seeds of different sizes, it may be desirable to impart a different arcuate shaking movement to the screens than when seeds of more irregular shape are to be graded. When seeds which are quite wet are to be graded it may be desirable to vary the shaking movement, to secure the best separation, from the type of shaking movement that would be given to the same seeds when in dry condition. With the present machine adjustment can be made to impart the proper shaking movement at any time to any seeds that are to be graded.

Of course, when the machine is in operation bags will be supported by the bag supports 37 at the ends of the various chutes 25, 26 and 27 and containers may be disposed below the chutes 28 and 32 and chute 53 so as to collect the seeds delivered.

It is found that very accurate grading of seeds results when the machine is in use. While the machine is intended primarily for the grading of seeds and particularly corn it can of course be used and it is contemplated it will be used for the grading of various types of granular material such as sand, gravel, etc.

Attention should be called to the fact that to readily remove the screens 20 for replacement by screens of different mesh or for cleaning of the screens, the chutes 25, 26 and 27 can be swung upwardly from their position resting against the pins 30 and the screens 20 can then be readily slid from the shaker box 18.

It will, of course, be understood that various changes may be made in the form, details, arrangement and proportions of the various parts without departure from the scope of the present invention which generally stated consists in the matter shown and described and set forth in the appended claims.

What is claimed is:

1. A machine for grading seed and the like comprising a frame, a shaker box supported therefrom, a plurality of screens carried by said box at different levels and of successively finer mesh from top to bottom of the box, each of said screens having a receiving end and a delivery end, chutes supported adjacent the delivery ends of the respective screens and to which the respective screens deliver, means for feeding the material to be graded onto the receiving end of the uppermost screen, bell crank levers pivotally supported respectively adjacent opposite sides of said box, each bell crank lever having one arm pivotally connected to one side of said box, a link pivotally interconnecting the other arms of the two bell crank levers, a member pivoted for swinging movement on the pivot of one of said bell crank levers, means for oscillating said member, and means for releasably connecting one of the arms of the bell crank lever pivoted on the same pivot as said member to said member at various arcuately swung positions relative to said member.

2. A machine for grading seeds and the like comprising a frame, a shaker box supported by said frame, a plurality of screens carried by said box at different levels and of finer mesh from top to bottom of the box, means for feeding the material to be graded onto the uppermost screen, a pair of shafts respectively located at the same horizontal level at opposite sides of the box, arms secured to said shafts projecting in the same direction therefrom and pivotally connected to said box, means for swinging both of said shafts as one shaft is swung, a member pivotally mounted on one of said shafts, means for oscillating said member, the arm carried by the shaft on which said member is pivoted being swingable to various angular positions relative to said member, means for preventing relative movement between said member and the arm carried by the shaft on which said member is pivoted at various angularly set positions of such arm relative to the member, and means for oscillating said member.

3. The structure defined in claim 2, said member having an upward stroke of oscillation and a downward stroke of oscillation and said oscillating means being constructed to impart a faster movement to the upward stroke than to the downward stroke.

4. A machine for grading seed and the like comprising a frame, a shaker box supported by said frame, a plurality of screens carried by said box at different levels said screens being of successively finer mesh from top to bottom of the box, means for delivering the material to be graded onto the uppermost screen, a pair of horizontal shafts journaled in said frame at opposite sides of said box, arms secured to said shafts projecting in the same direction therefrom and pivotally connected to said box at opposite sides thereof, means for causing simultaneous swinging movement of said shafts as one of said shafts is swung, a lever carried by one of said shafts, a sector-shaped plate pivoted to swing about the axis of the shaft carrying said lever, means for securing said lever to said plate at various arcuate settings of said lever relative to said plate, and means for oscillating said plate.

GEORGE LUNDIN.